(12) United States Patent
Alasti et al.

(10) Patent No.: US 6,442,656 B1
(45) Date of Patent: Aug. 27, 2002

(54) METHOD AND APPARATUS FOR INTERFACING MEMORY WITH A BUS

(75) Inventors: Ali Alasti, Los Altos; Nguyen Q. Nguyen, San Jose; Govind Malalur, Fremont, all of CA (US)

(73) Assignee: ATI Technologies SRL, Barbados (BB)

( * ) Notice: Subject to any disclaimer, the term of this patent is extended or adjusted under 35 U.S.C. 154(b) by 0 days.

(21) Appl. No.: 09/376,190

(22) Filed: Aug. 18, 1999

(51) Int. Cl.⁷ ............................................. G06F 12/00
(52) U.S. Cl. ...................... 711/154; 711/158; 710/52; 710/112
(58) Field of Search ................. 711/154, 158, 711/137; 710/22, 39, 52, 54, 112

(56) References Cited

U.S. PATENT DOCUMENTS

| | | | | |
|---|---|---|---|---|
| 5,237,567 A | * | 8/1993 | Nay et al. | 370/438 |
| 5,870,625 A | * | 2/1999 | Chan et al. | 710/5 |
| 5,918,070 A | * | 6/1999 | Moon et al. | 710/22 |
| 5,948,081 A | * | 9/1999 | Foster | 710/40 |
| 5,987,555 A | * | 11/1999 | Alzien et al. | 710/129 |
| 6,058,461 A | * | 5/2000 | Lewchuk et al. | 711/158 |
| 6,178,483 B1 | * | 1/2001 | Runaldue et al. | 711/137 |
| 6,216,208 B1 | * | 4/2001 | Greiner et al. | 711/137 |
| 6,247,102 B1 | * | 6/2001 | Chin et al. | 711/150 |

* cited by examiner

Primary Examiner—Do Hyun Yoo
Assistant Examiner—Nasser Moazzami
(74) Attorney, Agent, or Firm—Vedder, Price, Kaufman & Kammholz

(57) ABSTRACT

A method and apparatus for interfacing memory with a bus in a computer system includes processing that begins by receiving a transaction from the bus. The transaction may be a read transaction and/or a write transaction. Upon receiving the transaction, the process continues by validating the received transaction and, when valid, acknowledges its receipt. The processing then continues by storing the physical address, which was included in the received transaction, and the corresponding command in an address/control buffer. The processing continues by retrieving the physical address from the address/control buffer when the transaction is to be processed. The determination of when the transaction is to be processed is based on an ordering within the address/control buffer. The processing then continues by performing the transaction utilizing a first or second memory path based on the physical address, such that a first or second memory is accessed.

46 Claims, 7 Drawing Sheets

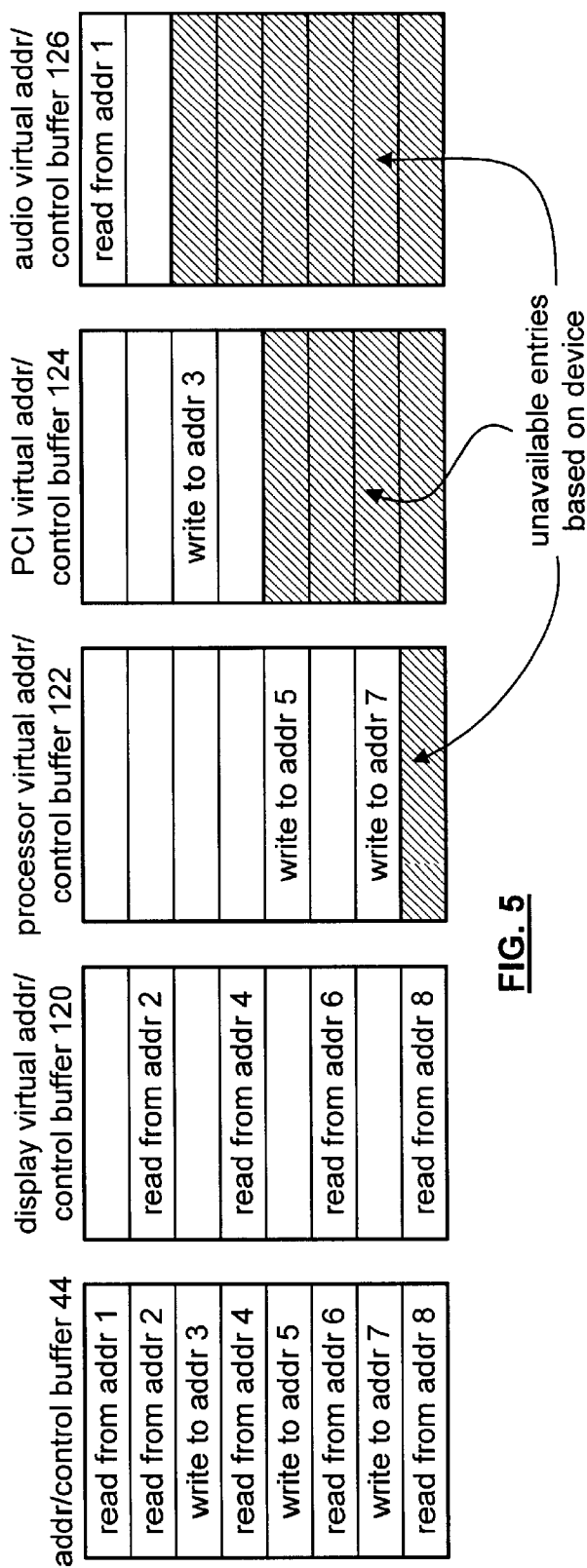

METHOD AND APPARATUS FOR INTERFACING MEMORY WITH A BUS

TECHNICAL FIELD OF THE INVENTION

This invention relates generally to computer architectures and more particularly with a memory interface.

BACKGROUND OF THE INVENTION

FIG. 1 illustrates a schematic block diagram of a computer system. As shown, the computer system includes a central processing unit (CPU) operably coupled to local cache and to a north bridge. The central processing unit when executing a memory transaction (e.g., a read from memory command, a write to memory command, or a read/write command) internally processes addresses associated with the transaction in virtual, or linear, address space. To communicate with the north bridge, the central processing unit converts the virtual addresses into physical addresses. The north bridge, upon receiving the physical addresses, determines whether the transaction is addressing a location within the accelerated graphics port (AGP) address space, the DRAM address space, or the PCI address space.

If the received physical address corresponds to the AGP address space, the north bridge further translates the physical address, using a GART table, into a corresponding physical address. Having obtained the physical address, the north bridge communicates with the memory to retrieve the appropriate memory block (e.g., line of memory, or multiple lines of memory where a line is 32 bits, 64 bits, 128 bits, etc.). If the physical address corresponds to the memory, the north bridge utilizes the physical address to facilitate the memory transaction. As such, if the memory transaction was a read transaction, the north bridge facilitates the retrieval of the corresponding memory line or lines from memory and provides them to the central processing unit. If the received physical address corresponds with the PCI address space, the north bridge passes the transaction to the PCI bus.

The south bridge, upon receiving a physical address, determines which of the plurality of I/O devices is to receive the transaction. To facilitate the forwarding of transactions to the I/O devices, the south bridge includes a plurality of memories, one for each I/O device coupled thereto, for queuing transactions to and from the corresponding I/O device. If an I/O device has a transaction queued, the south bridge, in a Round Robin manner, divides the PCI bus for transporting the queued transaction to the corresponding I/O device. As such, each I/O device has separate memory and therefore does not provide a dynamic interface.

In addition to the north bridge receiving transactions from the central processing unit, it may also receive transactions from the video graphics processor and the south bridge relaying transactions from I/O devices. Such transactions have varying requirements. For example, transactions from the central processing unit and video graphics processor are typically high speed transactions which require low latency. The amount of data in such transactions may vary but is generally a memory line or plurality of memory lines per transaction. The transactions from the I/O devices are generally large amounts of data (i.e., significantly more than several memory lines of data), but are typically latency tolerant.

In the system of FIG. 1, memory transactions are required to be synchronous with the processing speed of the memory. As such, the speed of transactions is restricted to the speed of memory. As is known in the art, improvements within the processing rate of the processing unit and the access rate of memory are increasing at different rates. Currently, the processors have a higher processing rate than the memory access rate of current memory devices. As such, the processing unit is not functioning at an optimal rate when performing memory transactions.

The video graphics processor provides display data to a display (not shown). Typically, the video graphics processor will include a frame buffer for storing at least part of a screen's worth of data. To minimize the size of the frame buffer or to extend the memory used for generating the display data, the video graphics processor often uses the AGP memory space. In this instance, the video graphics processor is writing to and reading from the memory via the AGP bus and the north bridge. The processing of video graphics data requires a high speed low-latency transmission path. Since the video graphics processor is a separate integrated circuit from the north bridge, it experiences the same limitations as the central processing unit to north bridge interface.

In the system of FIG. 1, the central processing unit, the north bridge, the video graphics processor, the south bridge, are fabricated as separate integrated circuits. As such, the transmission path from the central processing unit through the north bridge to the memory is of a relatively significant length, in comparison to buses within the integrated circuits. As is known in the art, the length of a physical path impacts the speed at which data may be transmitted. Such restrictions arise due to the inductance and capacitance of such transmission paths. In short, the relatively substantial lengths of these paths limit the bandwidth capabilities and speed capabilities of processing transactions.

Within such a system, the memory includes dynamic random access memory (DRAM), which is accessed via a single memory bus. If the system requires additional parallel memory, the system employs additional DRAMs and an addition memory bus. But with each additional DRAM bus, the north bridge requires an additional memory controller. For example, if the system includes four DRAM buses, the north bridge includes four memory controllers. In addition, each device coupled to the north bridge needs to know which DRAM it is accessing such that it provides the appropriate address in the read and/or write transaction. Further, if the memory were changed, each device would need to be updated with the new memory configuration.

Therefore, a need exists for a method and apparatus for an improved memory interface that, among other things, allows memory to change without having to update the devices of a computing system and without such devices having to know which DRAM it is accessing.

BRIEF DESCRIPTION OF THE DRAWINGS

FIG. 5 illustrates a graphical representation of an address/control buffer in accordance with the present invention;

FIG. 6 illustrates a graphical representation of address mapping and transaction prioritization in accordance with the present invention;

DETAILED DESCRIPTION OF A PREFERRED EMBODIMENT

Generally, the present invention provides a method and apparatus for interfacing memory with a bus in a computer system. Such a method and apparatus include processing that begins by receiving a transaction from the bus. The transaction may be a read transaction and/or a write transaction. Upon receiving the transaction, the process continues by validating the received transaction and, when valid, acknowledges its receipt. The processing then continues by storing the physical address, which was included in the received transaction, and the corresponding command (e.g., a read and/or write command) in an address/control buffer. The processing continues by retrieving the physical address from the address/control buffer when the transaction is to be processed. The determination of when the transaction is to be processed is based on an ordering within the address/control buffer. The processing then continues by performing the transaction utilizing a first or second memory path based on the physical address, such that a first or second memory is accessed. With such a method and apparatus, the memory configuration of a computing system may be dynamically altered without having to update the devices of a computing system. In addition, the devices of a computing system when accessing memory do not need to know which of a plurality of DRAMs it is accessing to successfully perform a memory transaction.

Figure 1:
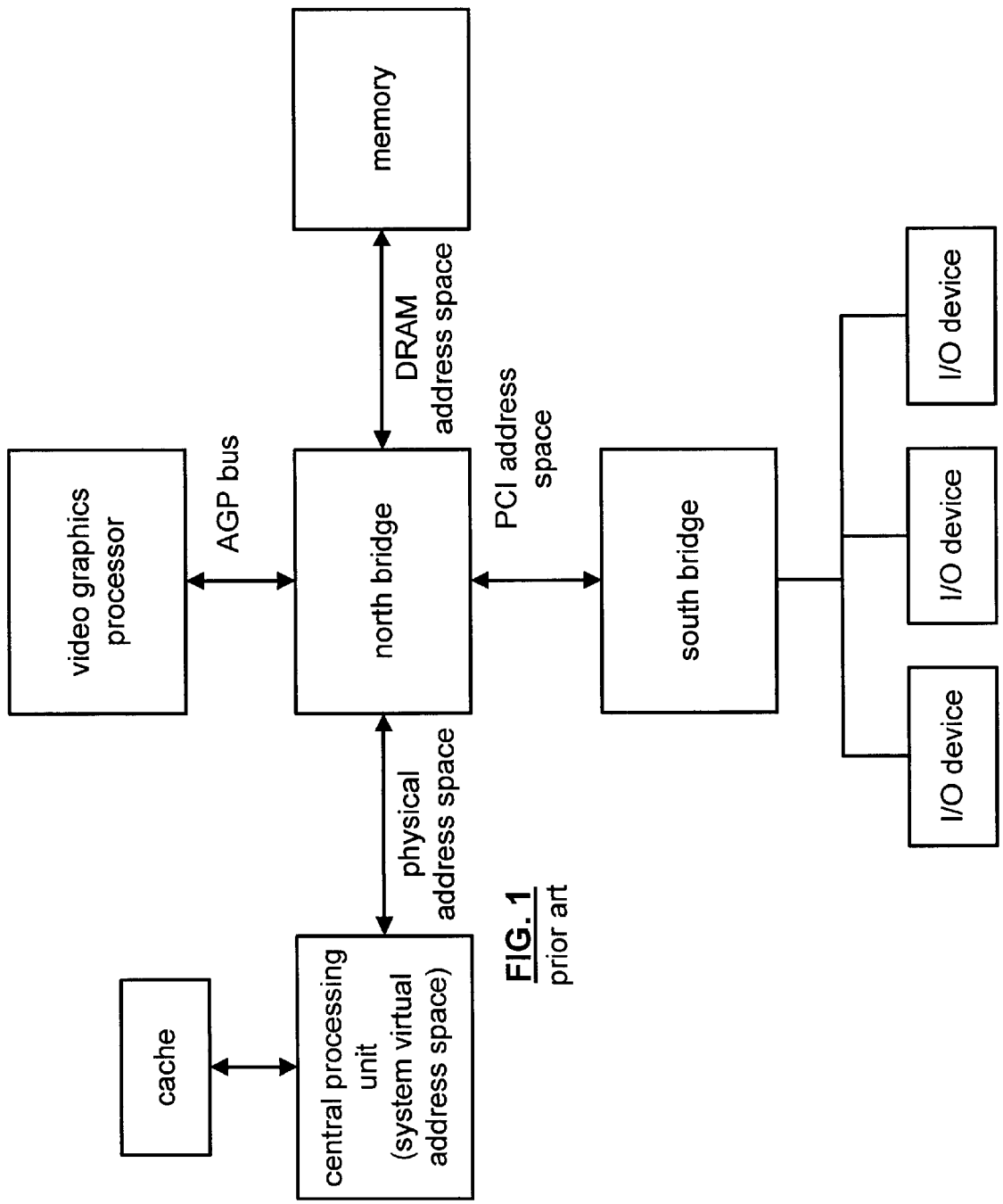
FIG. 1 illustrates a schematic block diagram of a prior art computing system.
Figure 2:
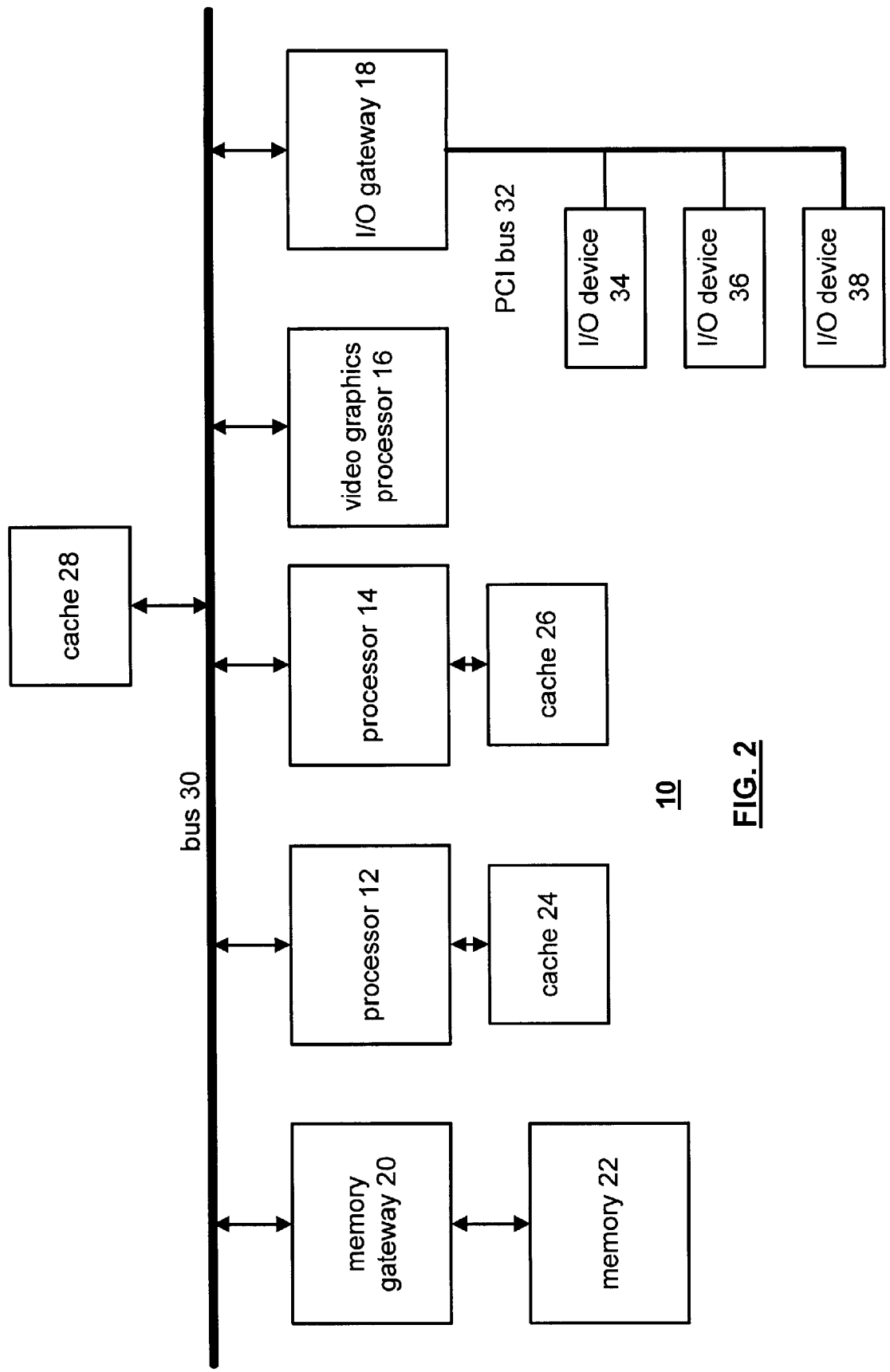
FIG. 2 illustrates a schematic block diagram of a computing system that includes a memory gateway in accordance with the present invention.

The present invention can be more fully described with reference to FIGS. 2 through 8. FIG. 2 illustrates a schematic block diagram of a computing system 10 that includes a plurality of processors 12 and 14, a video graphics processor 16, an I/O gateway 18, a memory gateway 20, a bus 30, and cache memory 28. The memory gateway 20 is operably coupled to a memory 22 and the I/O gateway 18 is coupled to a plurality of I/O devices 34–38 via a PCI bus 32. The system 10 is also shown to include cache memory 24 and 26 operably coupled to processors 12 and 14. In various embodiments of system 10, only include cache 28 may be included, only cache 24 or 26 may be included, or all caches 24, 26, and 28 may be included. For a more detailed discussion of cache sharing in such a computing system 10 refer to co-pending application entitled "Method and Apparatus for Sharing Cache Memory" having a Ser. No. 09/328, 844 and a filing date of Jun. 9, 1999.

The computing system 10 may be implemented as an integrated circuit wherein the bus 30 is a low-latency, high bandwidth data bus. In one embodiment, the bus 30 may include a 256 data bit line and operate at 500 megahertz. For a detailed discussion of functionality of bus 30, refer to co-pending patent application entitled "Method and Apparatus for Busing Data Elements" having a Ser. No. 09/328, 971 and a filing date of Jun. 9, 1999. In general, the transactions placed on bus 30 utilize the physical address space.

The I/O devices 34–38 may be sound cards, television encoder cards, or circuits, MPEG decoders/encoders (for example, digital satellite transceivers), a display (e.g., an LCD display, CRT monitor), and/or any peripheral computer device that interfaces with the computing system via the PCI bus.

The memory gateway 20 is coupled to memory 22, which may be a single dynamic RAM access memory (DRAM) or a plurality of DRAMs. Regardless of the configuration of memory 22, memory gateway 20 presents a single memory device to the bus 30, and thus the components coupled thereto. As such, memory 22 may be changed by adding or deleting DRAMs, incorporating newer memory devices that have faster access times, etc., with changes only to the internal workings of the memory gateway 20. To the rest of the computing system 10, the memory 22 has not changed. Note that, at boot-up of the computing system, the performance of the operating system would determine the available memory space, such that the computing system was aware of an increase or decrease in the amount of available memory.

Figure 3:
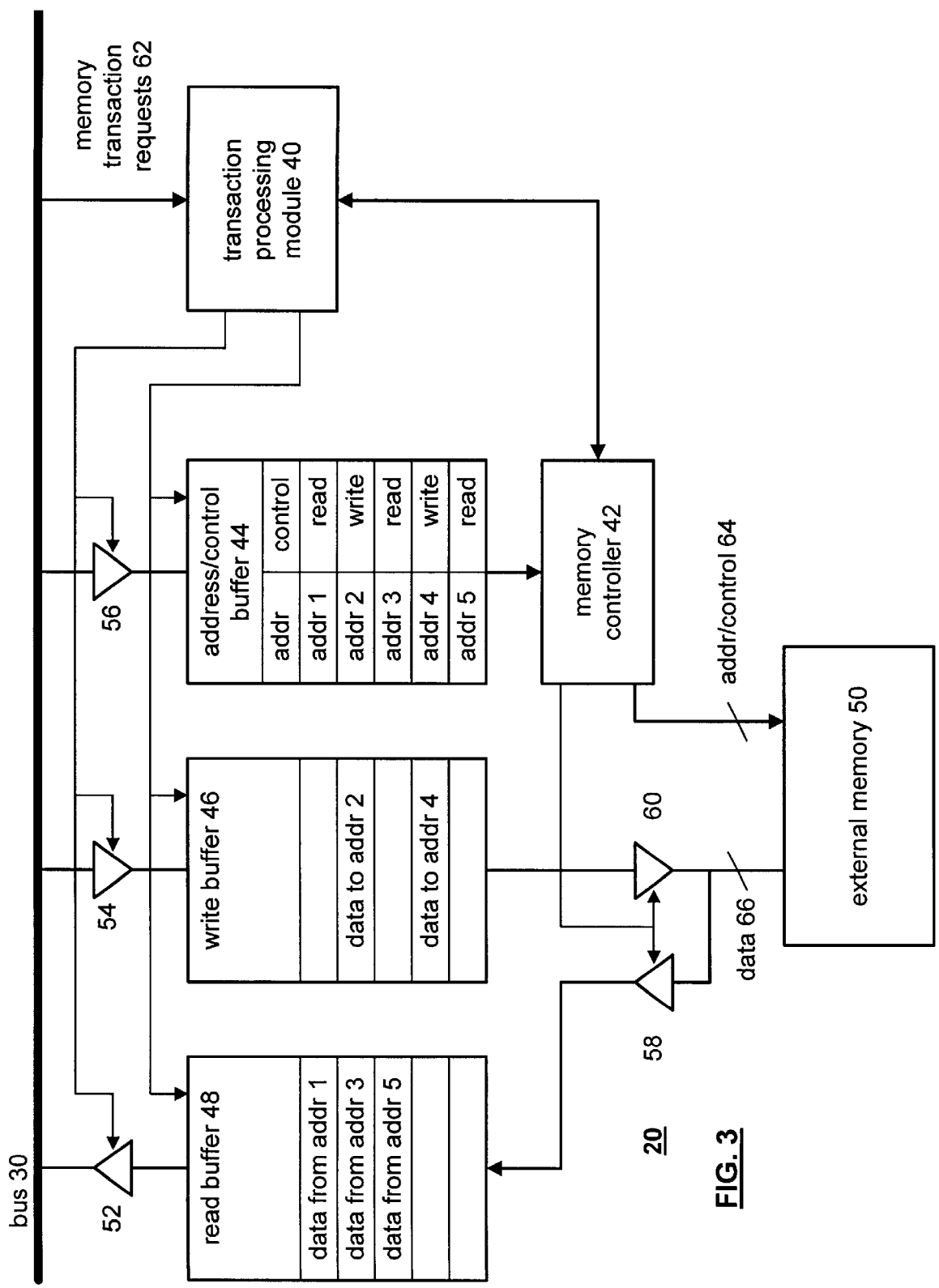
FIG. 3 illustrates a schematic block diagram of the memory gateway in accordance with the present invention.

FIG. 3 illustrates a schematic block diagram of memory gateway 20. The memory gateway 20 includes a read buffer 48, a write buffer 46, an address/control buffer 44, a transaction processing module 40, a memory controller 42 and a plurality of gates 52 through 60. The transaction processing module 40 which may be a single processing device or a plurality of processing devices where such a processing device may be a microcontroller, microcomputer, microprocessor, digital signal processor, logic circuitry, state machine, and/or any device that manipulates information based on operational instructions. The operational instructions performed by the transaction processing module 40 may be stored in the external memory 50 or in memory contained within the memory gateway 20. Such internal memory is not shown but could be a RAM, ROM, EEPROM and/or any device that stores digital information in a retrievable manner. The operational instructions performed by the transaction processing module are generally discussed with reference to this FIG. 3 and further discussed with reference to FIGS. 4 through 8.

The transaction processing module 40 monitors the bus 30 for memory transaction requests. Such memory transaction requests may include read transactions, write transactions and read/write transactions. When a transaction is detected on the bus, the transaction processing module 40 determines whether the address/control buffer 44 has an available entry to store the transaction. If not, the transaction processing module 40 issues a retry message on the bus 30 during a status update interval for the current transaction. If, however, the address/control buffer 44 has an available entry for the current transaction, the transaction processing module 40 enables gates 56 and 54 for a write transaction and only gate 56 for a read transaction. The transactions stored in the address/control buffer 44 are processed in a first-in, first-out manner. However, as one of average skill in the art would appreciate, a prioritization scheme may be employed based on the type of transaction, the requester of the transaction, and/or any other prioritization scheme desired. For example, read memory requests for the display may have priority over microprocessor requests which have priority over PCI device requests.

The memory controller 42, at the rate of the external memory, retrieves a transaction from the address/control buffer 44 when a transaction is to be processed. As shown, the address/control buffer 44 stores the address and the corresponding control command. As such, the control may be a read command, a write command, or a read/write command. Note that when the memory gateway 20 is processing a read/write command, the data must first be read from external memory and subsequent written back to external memory after it has been processed by the requesting entity. As such, a read/write command will be maintained in the address/control buffer until the entire transaction is completed or treated as two separate transactions. For the transaction retrieved from the address/control buffer 44, the memory controller 42 provides the address and control information 46 to the external memory 50. If the transaction is a write transaction, the memory controller also enables gate 60 such that the data corresponding to the transaction can be written from the write buffer 46 to external memory. If the transaction is a read transaction, the memory controller 42 provides the address and control information 64 to the external memory and enables gate 58 such that the data 66 may be retrieved from the external memory and written into the read buffer 48.

For a read transaction, once the data is written into the read buffer 48, the transaction processing module 40, when the bus is available, enables gate 52 such that the data is placed on the bus 30. Once the read transaction has been placed on the bus 30, the transaction processing module 40 invalidates the corresponding entry within the address/control buffer 44 after successful conveyance on the bus such that that entry may be used for a subsequent memory transaction. The transaction processing module 40 also invalidates a corresponding write transaction within the address/control buffer 44 when the data has been written to external memory.

The address/control buffer 44 may include a limited number of entries, for example, 8, 16 or 32 entries and the read and write buffers 48 and 46 include a corresponding number of entries. The address/control buffer 44 stores the address and control information for each transaction while the read buffer 48 only stores data for read transactions and the write buffer 46 only stores data for write transactions. In addition, as illustrated in FIG. 3, the first transaction in the address/control buffer 44 is a read transaction, the first entry in the write buffer 46 will be blank while the first entry in the read buffer 48 is available for storing the data for this particular transaction. A comparison of entries within the address/control buffer 44 and the corresponding entries in the read buffer 48 and write buffer 46 will further illustrate this relationship.

Under the control of the transaction processing module 40, the memory gateway 20 provides an interface to bus 30 that allows data to be written to and read from bus 30 at the rate of the bus while the access to external memory 50 is done at the rate of the external memory. In addition, the transaction processing module 40 and memory controller 42, as will be discussed in greater detail with reference to FIG. 4, allow the external memory 50 to be changed without requiring the devices coupled to bus 30 to be aware of such changes and make any changes in the manner in which they provide memory transactions on bus 30.

Figure 4:
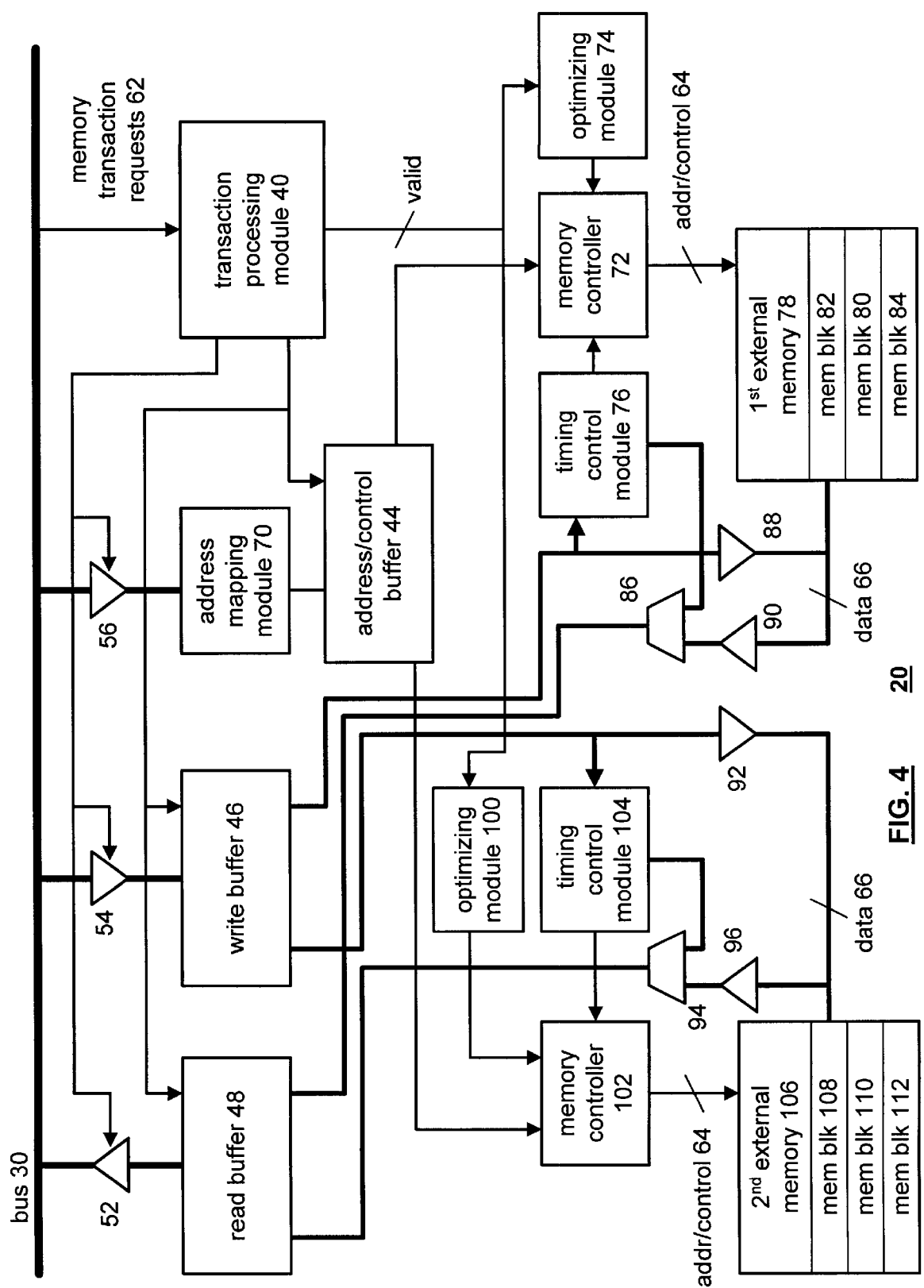
FIG. 4 illustrates an alternate schematic block diagram of the memory gateway in accordance with the present invention.

FIG. 4 illustrates an alternate schematic block diagram of memory gateway 20. In this embodiment, the memory gateway 20 is interfacing with two external memories 78 and 106. As one of average skill in the art would appreciate, the memory gateway 20 may interface with many more external memory devices than the two shown and would include the corresponding circuitry within memory gateway 20 to interface with those devices. Note that the components of memory gateway 20 may be implemented as individual devices or performed by a processing device executing operational instructions. As such, additional external memory may be coupled to the memory gateway 20 by executing further operational instructions as opposed to having to increase the number of components therein.

The memory gateway 20 includes the read buffer 48, the write buffer 46, the address/control buffer 44, the transaction processing module 40, a first memory access path and a second memory access path. The first memory access path includes the first address mapping module 70, memory controller 72, an optimizing module 74, a timing module 76, gates 88 and 90, and multiplexor 86. The second memory access path includes the address mapping module 70, a second memory controller 102, a second optimizing module 100, a second timing control module 104, gates 92 and 96, and multiplexor 94. In operation, the read buffer 48, write buffer 46, and address/control buffer 44 perform as discussed with reference to FIG. 3. For transactions stored in the address/control buffer 44, the address mapping module determines the entries in the address/control buffer 44 that are requesting access to the first external memory 78 or to the second external memory 106. This may be done by simply determining the physical address of the transaction such that the mapping module maps the request to the appropriate external memory.

The mapping module 70 pass the address and control portions of the memory transactions to the address/control buffer, which relays the transaction to their respective memory controllers 72 and 102. As such, memory controller 72 will only receive memory transactions that are directed towards the first external memory 78. Similarly, memory controller 102 will only receive transactions that are directed towards the second external memory 106. The transaction processing module 40, in addition to performing the functions described with reference to FIG. 3, also provide valid information to the optimizing module 74 and 100. The valid information indicates which of the entries in the address/control buffer 44 are valid. As such, entries that are not valid, will not be processed. The optimizing module 74 and 100 utilize each valid entry in the address/control buffer 44 to order the transactions such that the memory controller 72 and 102 access the first external memory 78 or the second external memory 106 in an efficient manner. The optimization scheme used by the optimizing modules 74 and 100 will be discussed in greater detail with reference to FIG. 6.

The timing control modules 76 and 104 are utilized to provide the appropriate timing sequence based on the particular type of external memory 78 and 106. As such, the timing control modules 76 and 104 provide the timing information needed for the memory controllers such that they access the external memories at the rate of the external memories. When an external memory is changed, the timing control modules 76 and 104 are updated with the corresponding new timing information of the external memory. As such, external memory may be readily changed with minimal impact on the entire computing system and minimal impact on the memory gateway 20.

The gates 88, 90, 92 and 96 provide the coupling between the read and write buffers and the corresponding first and second external memories. Such gates are enabled based on the particular transaction being performed and which external memory is accessed.

Each of the external memories 78 and 106 are shown to include a plurality of memory banks 80 through 84 and 108 through 112. This information is utilized by the optimizing module 74 and 100 to provide more optimal accesses to the external memories 106 and 78. Generally, the optimizing modules 74 and 100 group the transactions within the address/control buffer 44 such that transactions addressing the same memory bank are performed consecutively to reduce delays in switching from one memory bank to another. In addition, the optimizing module 74 and 100 may further group the transactions based on the type of transactions. As such, read transactions will be grouped together and performed successively, as will write transactions. Grouping transactions by type reduces the delays that result from switching memory from reading data to writing data.

FIG. 5 illustrates a graphical representation of the address/control buffer 44 and corresponding virtual address/control buffers 120–126 for various types of components coupled to bus 30. While the system includes a single address/control buffer 44, the transaction processing module 40, based on the device requesting the transaction, gives priority to transactions from certain devices using the virtual address/control buffers. As shown, a display virtual address/control buffer 120 has a corresponding number of available entries as does the actual address/control buffer 44. The processor virtual control buffer 122 has seven entries available to it and one entry that is unavailable. The PCI virtual address/control buffer 124 has four available entries and four unavailable entries. The audio virtual address/control buffer 126 has two entries available and six entries that are unavailable.

As an illustrative example, the address/control buffer 44 includes eight entries, each including a valid transaction. As shown, the first entry is a transaction for an audio device, the second, fourth, sixth and eighth entries store transactions for the display, the third entry stores a transaction for a PCI device, and the fifth and seventh entries store transactions for the processor. By the nature of the virtual address/control buffers, if the first and second entries are unavailable when a transaction for an audio device is received, the transaction will be rejected. Similarly, if a transaction for a PCI device is received and the first four entries are not available, the transaction will be rejected. As such, only the display has all entries available to it. In this manner, prioritization is given first to display transactions, then to processor originated transactions, then to PCI transactions and finally to audio transactions. As such, transactions for the display should almost always have an available entry, the processor transactions will be likely to have an available entry where the PCI and audio transactions are somewhat less likely to have an available entry.

As one of average skill in the art would appreciate, more virtual address/control buffers may be utilized by the transaction processing module depending on the devices coupled to the computing system. For example, television encoder/decoder may have its own virtual address/control buffer, the transaction processing module 40 may also include a virtual address/control buffer for MPEG data, etc. As one of average skill in the art would further appreciate the address/control buffer 44 is sized such that few transactions are rejected.

FIG. 6 illustrates a graphic representation of mapping addresses by the address mapping modules 70 and 98 and the prioritization schemes generated by the optimizing modules 74 and 100. As an illustrated example, the transactions stored in the address/control buffer 44 as shown in FIG. 5 have been mapped 130 either to the first or second external memory. As shown, the first, second, fourth, seventh and eighth transactions in the address/control buffer 44 are mapped to external memory one while the remaining transactions three, five and six map to external memory two. Based on this mapping, the optimizing modules may give the highest priority to transactions occurring within the same memory bank, i.e., with minimal address bus changes, with second priority to the type of transactions or vice-versa. One table indicates giving priority to the same memory banks. This is shown in the grouped transactions for memory one, table 132. In this transaction grouping scheme, transactions that are addressing the same memory bank are grouped together, then grouped by type of transaction within each memory bank. As shown, read from address one and write to address seven are within the first memory bank while read from address four and eight are in a second memory bank and read from address two is in a third memory bank. Thus, the grouping of memory transactions will be done such that the processing of these five transactions incur only two memory bank transitions.

Alternatively, group transactions 134 may prioritize first based on the type of transaction and then based on the memory block, or bank. As shown, read transactions that are reading from address one, four, eight and two will be grouped together and then write to address seven will be done separately. Thus, the data bus of the external memory is only switched once from a read transaction to a write transaction but three memory bank transitions occur. As one of average skill in the art will appreciate, the prioritization scheme used will be dependent on whether it is more efficient to address within the same memory bank or to address like transactions.

The transaction grouping based on priority is done in a round robin fashion as each transaction is being received. Thus, a newly received transaction that corresponds to the same type of transaction and is addressing the same memory bank may be processed prior to an existing entry within the address/control buffer 44. As such, the prioritization of the grouping of transactions 132 or 134 will be updated as new transactions are received into the address/control buffer 44.

Figure 7:
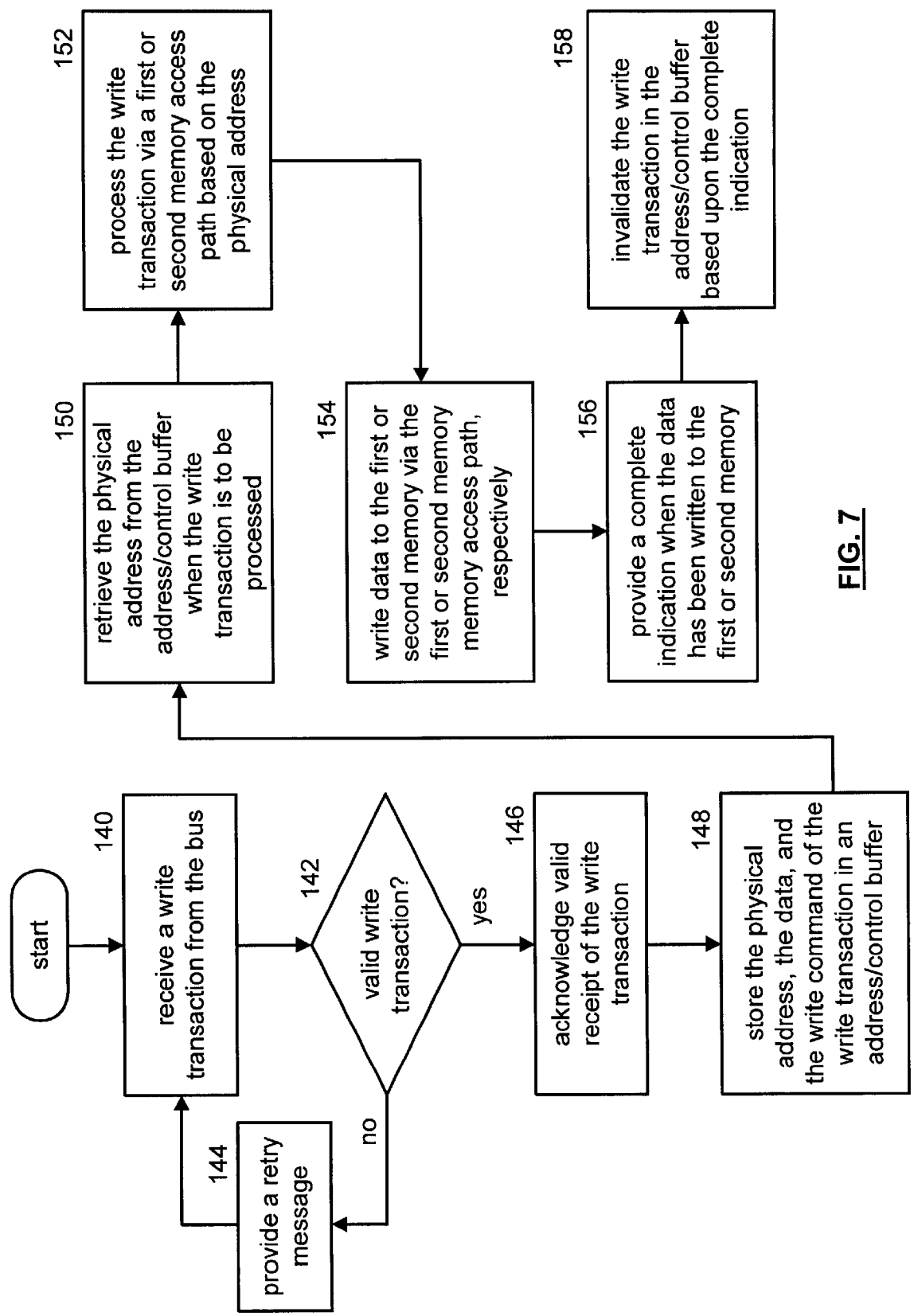
FIG. 7 illustrates a logic diagram of a method for processing write transactions in accordance with the present invention.

FIG. 7 illustrates a logic diagram of a method for processing write transactions by the memory gateway 20. The process begins at step 140 where a write transaction is received from the bus. The write transaction includes the physical address of memory, a write command and data to be written into the memory at a location identified by the physical address. The transaction may further identify the particular entity that originated the transaction (e.g., processor 12, 14, the video graphics processor 16, or the I/O gateway 18). The process then proceeds to step 142 where a determination is made as to whether the write transaction is valid. The write transaction may be invalid if the address/control buffer is full of pending transactions or may be invalid based on the particular type of entity requesting the write transaction (i.e., the corresponding virtual address/control buffer is full). As previously discussed with reference to FIG. 5, depending on the identity of the initiator of the transaction, less entries are available within the address/control buffer. As such, unless an entry is available in the locations available to that particular device, the address/control buffer appears full to those devices. If the write transaction is invalid, the process proceeds to step 146 where a retry message is provided.

If, however, the write transaction is valid, the process proceeds to step 144 where an acknowledgment is provided that the write transaction was properly received. The process then proceeds to step 148 where the physical address and the write command of the transaction are stored in the address/control buffer. The process then proceeds to step 150 where the physical address is retrieved from the address/control buffer when the write transaction is to be processed. Note that the processing of the write transaction may occur by grouping pending write transactions in the address/control buffer and retrieving in a sequential order the group of write transactions. In addition, the write transactions may be further grouped based on memory blocks or memory banks of the first or second external memories.

The process then proceeds to step 152 where the write transaction is processed via a first or second memory path based on the physical address. Such processing may occur by address mapping the physical address to a first or second external memory. If the physical address maps to the first memory, a first memory access path is utilized. Alternatively, if the physical address maps to a second memory, a second memory path is utilized.

The process then proceeds to step 154 where data is written to the first or second memory via the first or second memory access path, respectively. The processing of the write transaction, i.e., providing the data to the external memory, is done based on memory access timing of the first or second memory being accessed. The process then proceeds to step 156 where a complete indication is provided when the data has been written to the first or second memory. The process then proceeds to step 158 where the write transaction and the address/control buffer is invalidated once the transaction has been completed.

Figure 8:
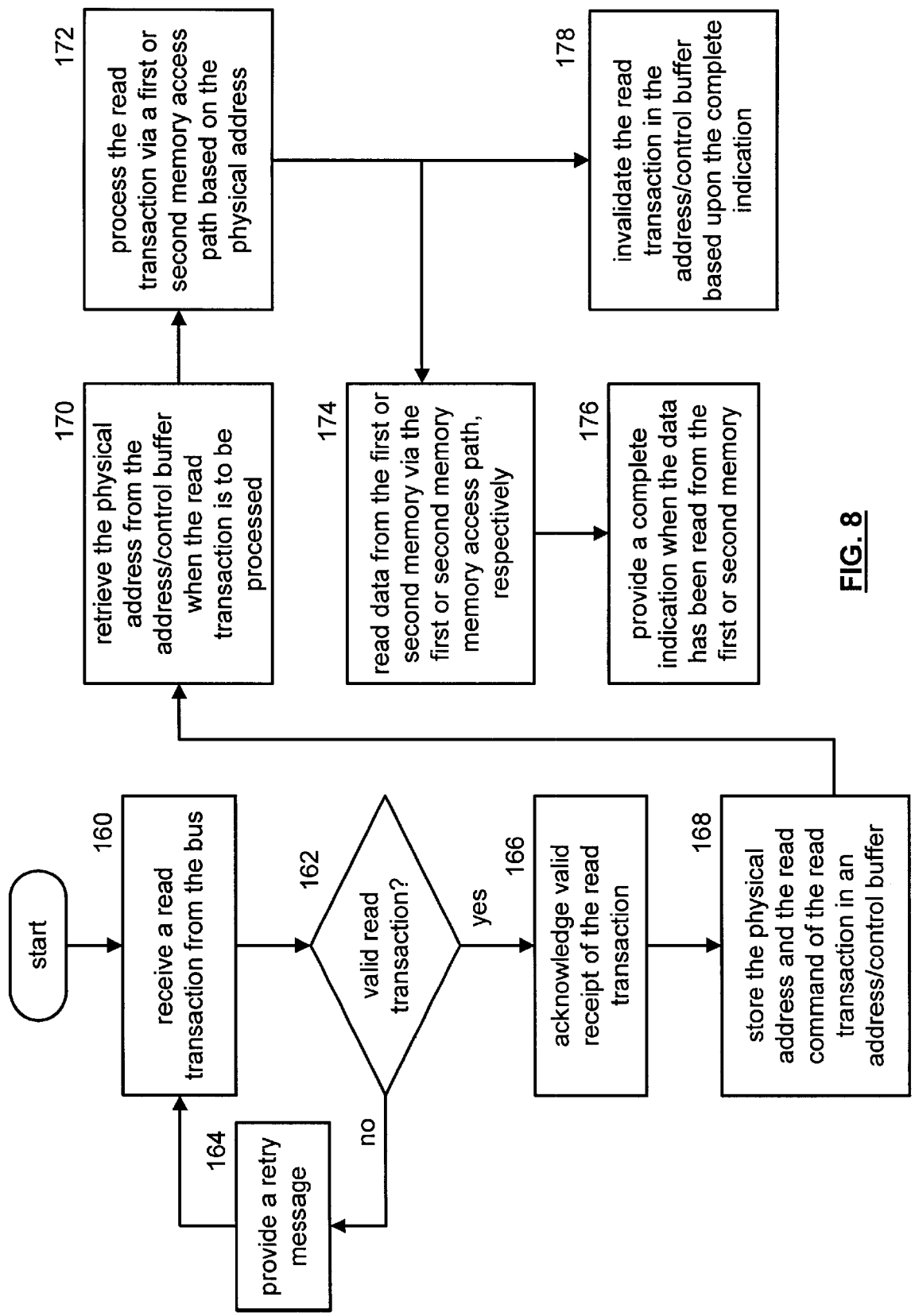
FIG. 8 illustrates a logic diagram of a method for processing read transactions in accordance with the present invention.

FIG. 8 illustrates a logic diagram of a method for processing read transactions by the memory gateway 20. The process begins at step 160 where a read transaction is received from the bus. Note that both read and write transactions interface with the bus 30 at the rate of the bus while interfacing with external memory occurs at the rate of the external memory. The process then proceeds to step 162 where a determination is made as to whether the read transaction is valid. The read transaction is valid when an available entry exists in the address/control buffer, which may correspond to one of the virtual address/control buffers described with reference to FIG. 5. If the read transaction is not valid, the process proceeds to step 164 where a retry message is provided.

If, however, the read transaction is valid, the process proceeds to step 166 where the receipt of the read transaction is acknowledged. The proceeds to step 168 where the physical address and the read command of the transaction are stored in the address/control buffer. The process then proceeds to step 170 where the physical address is retrieved from the address/control buffer when the read transaction is to be processed. Note that read transactions may be grouped based on the fact that they are read transactions and further grouped based on which memory block within the first or second memory they are affiliated with. Such grouped transactions will be executed in a sequential order.

The process proceeds to step 172 where the read transaction is processed via a first or second memory access path based on the physical address. As such, the first memory path will be used when the first external memory is being addressed and the second access path will be used when the second external memory is being accessed. The process then proceeds to step 174 and step 178, where, at step 174, data is read from the read buffer into the first or second memory via the first or second memory access path. The process then proceeds to step 176 where a complete indication is provided when the data has been read from the first or second memory and placed on the bus 30. At step 178 the read transaction and the address/control buffer are invalidated once the complete indication has been provided.

The preceding discussion has presented a method and apparatus for interfacing memory to a bus within a computer system. The processing may be done within a memory gateway such that the memory gateway provides interfacing with the bus at the rate of the bus and interfacing with memory at the rate of the memory. In addition, the memory gateway provides independence between the system and the memory such that the memory may be changed (e.g., increased in size, decreased in size, add additional memory banks or changing operating rates) without notification to the devices coupled to bus 30. In addition, devices coupled to bus 30 treat the external memory as a single memory block and the memory gateway determines which external memory is being addressed. As one of average skill in the art will appreciate, other embodiments may be derived from the teachings of the present invention without deviating from the scope of the claims or the spirit of the invention.

what is claimed is:

1. A memory gateway comprises:
   a read buffer having a plurality of addressable read buffer lines;
   a write buffer having a plurality of addressable write buffer lines;
   a transaction processing module operably coupled to a bus to receive memory transactions requests, wherein each of the memory transaction requests includes identity of an entity that initiated the memory transaction request, wherein the transaction processing module processes each of the memory transaction requests based on the identity of the requesting entity;
   an address/control buffer operably coupled to the transaction processing module, wherein the address control buffer stores an address and control information for each of the memory transaction requests when the transaction processing module indicates that each of the memory transaction request is to be fulfilled; and
   a memory access path operably coupled to enable, for a write transaction of the memory transaction requests in the address/control buffer, writing of data from the write buffer to an external memory, and operably coupled to enable, for a read transaction of the memory transaction requests in the address/control buffer, reading of data from the external memory to the read buffer.

2. The memory gateway of claim 1, wherein the memory access path further comprises:
   a first memory path operably coupled to a first memory of the external memory; and a second memory path operably coupled to a second memory of the external memory, herein the first and second memory paths determine, based on an address of the write transaction or of the read transaction, whether the first or second memory is being addressed.

3. The memory gateway of claim 2, wherein the first memory path further comprises:
   a first data path operable to provide, when enabled, a first write path between the write buffer and the first memory for the write transaction and operable to provide, when enabled, a first read path between the read buffer and the first memory for the read transaction; and
   a first address/control path operable to receive address and control signals of the write or read transaction and to determine that the first memory is being addressed, wherein the first address/control path enables the first write path when the first memory is being addressed and the control signals indicate the write transaction.

4. The memory gateway of claim 3, wherein the first address/control path receives a valid indication from the transaction processing module for the write or read transaction, wherein the valid indication indicates validity of the write or read transaction, wherein the first address/control path does not enable the first read or write path when the write or read transaction is invalid.

5. The memory gateway of claim 4, wherein the transaction processing module enables overwriting the write or read transaction in the address/control buffer when the write or read transaction is invalid.

6. The memory gateway of claim 3, wherein the first address/control further comprises:
   an address mapping module operably coupled to determine whether pending transactions in the address/control buffer are addressing the first memory;
   an optimizing module operably coupled to group the pending transactions that are addressing the first memory based on type of transaction of the pending transactions, wherein the read or write transaction is one of the pending transactions;
   a first memory controller operably coupled to the optimizing module, wherein the first memory controller interfaces with the first memory to perform the group of pending transactions based on the associated control signals; and
   a first memory timing control module operably provide memory accessing timing information to the first memory controller, wherein the memory accessing timing information is based on parameters of the first memory.

7. The memory gateway of claim 6, wherein the optimizing module further groups the pending transactions based on which memory blocks of the first memory are being addressed.

8. The memory gateway of claim 2, wherein the second memory path further comprises:
   a second data path operable to provide, when enabled, a second write path between the write buffer and the second memory for the write transaction and operable to provide, when enabled, a second read path between the read buffer and the second memory for the read transaction; and
   a second address/control path operable to receive address and control signals of the write or read transaction and to determine that the second memory is being addressed, wherein the second address/control path enables the second write path when the second memory is being addressed and the control signals indicate the write transaction.

9. The memory gateway of claim 8, wherein the second address/control path receives a valid indication from the transaction processing module for the write or read transaction, wherein the valid indication indicates validity of the write or read transaction, wherein the second address/control path does not enable the second read or write path when the write or read transaction is invalid.

10. The memory gateway of claim 8, wherein the second address/control further comprises:
    an address mapping module operably coupled to determine whether pending transactions in the address/control buffer are addressing the second memory;
    an optimizing module operably coupled to group the pending transactions that are addressing the second memory based on type of transaction of the pending transactions, wherein the read or write transaction is one of the pending transactions;
    a second memory controller operably coupled to the optimizing module, wherein the second memory controller interfaces with the second memory to perform the group of pending transactions based on the associated control signals; and
    a second memory timing control module operably provide memory accessing timing information to the second memory controller, wherein the memory accessing timing information is based on parameters of the second memory.

11. The memory gateway of claim 10, wherein the optimizing module further groups the pending transactions based on which memory blocks of the second memory are being addressed.

12. The memory gateway of claim 1, wherein the transaction processing module processes the memory transaction requests by varying available size of the address/control buffer based on the identity of the requesting entity.

13. The memory gateway of claim 12, wherein the transaction processing module flags completion of the read transaction and correspondingly invalidates the read transaction in the address/control buffer and wherein the transaction processing module receives an indication that the write transaction has been completed and correspondingly invalidates the write transaction in the address/control buffer.

14. A method for interfacing memory to a bus, the method comprises the steps of:
    receiving a write transaction from the bus, wherein the write transaction includes a physical address of memory, a write command, and data to be written into the memory at a location identified by the physical address;
    acknowledging valid receipt of the write transaction;
    storing the physical address and the write command of the write transaction in an address/control buffer when validly received;
    retrieving the physical address from the address/control buffer when the write transaction is to be processed;
    processing the write transaction via a first or second memory access path based on the physical address; and
    writing the data to a first or second memory of the memory via the first or second memory access path, respectively.

15. The method of claim 14 further comprises providing a retry message when the receipt of the write transaction was invalidly received.

16. The method of claim 15 further comprises determining that the write transaction was invalidly received when the address/control buffer is full of pending transactions.

17. The method of claim 16 further comprises varying availability of entries in the address/control buffer based on identity of an entity that initiated the write transaction.

18. The method of claim 14, wherein the step of retrieving the physical address further comprises:
    grouping pending write transactions in the address/control buffer, wherein the write transaction is one of the pending transactions; and
    retrieving, in a sequential order, a group of write transactions that include the write transaction.

19. The method of claim 18 further comprises:
    grouping the pending write transactions based on which memory blocks of the first or second memory are being addressed.

20. The method of claim 14, wherein the step of processing the write transaction further comprises:
    mapping the physical address to the first memory or the second memory;
    utilizing the first memory access path when the physical address maps to the first memory; and
    utilizing the second memory access path when the physical address maps to the second memory.

21. The method of claim 14, wherein the processing of the write transaction further comprises:
    providing a complete indication when the data has been written to the first or second memory; and invalidating the write transaction in the address/control buffer based upon the completion indication.

22. The method of claim 14, wherein the processing of the write transaction further comprises:

establishing memory access timing based on parameters of the first or second memory.

23. A method for interfacing memory to a bus, the method comprises the steps of:

receiving a read transaction from the bus, wherein the read transaction includes a physical address of memory and a read command, wherein the physical address indicates a location in the memory that contains the data to be read;

acknowledging valid receipt of the read transaction;

storing the physical address and the read command of the read transaction in an address/control buffer when validly received;

retrieving the physical address from the address/control buffer when the read transaction is to be processed;

processing the read transaction via a first or second memory access path based on the physical address; and reading the data from a first or second memory of the memory via the first or second memory access path, respectively.

24. The method of claim 23 further comprises providing a retry message when the receipt of the read transaction was invalidly received.

25. The method of claim 24 further comprises determining that the read transaction was invalidly received when the address/control buffer is full of pending transactions.

26. The method of claim 25 further comprises varying availability of entries in the address/control buffer based on identity of an entity that initiated the read transaction.

27. The method of claim 23, wherein the step of retrieving the physical address further comprises:

grouping pending read transactions in the address/control buffer, wherein the read transaction is one of the pending transactions; and retrieving, in a sequential order, a group of read transactions that include the read transaction.

28. The method of claim 27 further comprises:

grouping the pending read transactions based on which memory blocks of the first or second memory are being addressed.

29. The method of claim 23, wherein the step of processing the read transaction further comprises:

mapping the physical address to the first memory or the second memory;

utilizing the first memory access path when the physical address maps to the first memory; and utilizing the second memory access path when the physical address maps to the second memory.

30. The method of claim 23, wherein the processing of the read transaction further comprises:

providing a complete indication when the data has been read from the first or second memory; and invalidating the read transaction in the address/control buffer based upon the completion indication.

31. The method of claim 23, wherein the processing of the read transaction further comprises:

establishing memory access timing based on parameters of the first or second memory.

32. A memory gateway comprises:

a processing module; and memory operably coupled to the processing module, wherein the memory includes a first memory section and a second memory section, and wherein the memory stores operational instructions that cause the processing module to:

receive a write transaction from the bus, wherein the write transaction includes a physical address of memory, a write command, and data to be written into the memory at a location identified by the physical address;

acknowledge valid receipt of the write transaction;

store the physical address and the write command of the write transaction in an address/control buffer when validly received;

retrieve the physical address from the address/control buffer when the write transaction is to be processed;

process the write transaction via a first or second memory access path based on the physical address; and write the data to the first or second memory via the first or second memory access path, respectively.

33. The memory gateway of claim 32, wherein the memory further comprises operational instructions that cause the processing module to provide a retry message when the receipt of the write transaction was invalidly received by determining that the write transaction was invalidly received when the address/control buffer is full of pending transactions.

34. The memory gateway of claim 33, wherein the memory further comprises operational instructions that cause the processing module to vary availability of entries in the address/control buffer based on identity of an entity that initiated the write transaction.

35. The memory gateway of claim 32, wherein the memory further comprises operational instructions that cause the processing module to retrieve the physical address by:

grouping pending write transactions in the address/control buffer, wherein the write transaction is one of the pending transactions; and retrieving, in a sequential order, a group of write transactions that include the write transaction.

36. The memory gateway of claim 35, wherein the memory further comprises operational instructions that cause the processing module to:

group the pending write transactions based on which memory blocks of the first or second memory are being addressed.

37. The memory gateway of claim 32, wherein the memory further comprises operational instructions that cause the processing module to process the write transaction by:

mapping the physical address to the first memory or the second memory;

utilizing the first memory access path when the physical address maps to the first memory; and utilizing the second memory access path when the physical address maps to the second memory.

38. The memory gateway of claim 33, wherein the memory further comprises operational instructions that cause the processing module to process the write transaction by:

establishing memory access timing based on parameters of the first or second memory.

39. A memory gateway comprises:

a processing module; and memory operably coupled to the processing module, wherein the memory includes a first memory section and a second memory section, and wherein the memory stores operational instructions that cause the processing module to:

receive a read transaction from the bus, wherein the read transaction includes a physical address of memory and a read command, wherein the physical address indicates a location in the memory that contains the data to be read;

acknowledge valid receipt of the read transaction;

store the physical address and the read command of the read transaction in an address/control buffer when validly received;

retrieve the physical address from the address/control buffer when the read transaction is to be processed;

process the read transaction via a first or second memory access path based on the physical address; and read the data from the first or second memory via the first or second memory access path, respectively.

40. The memory gateway of claim 39, wherein the memory further comprises operational instructions that cause the processing module to provide a retry message when the receipt of the read transaction was invalidly received by determining that the read transaction was invalidly received when the address/control buffer is full of pending transactions.

41. The memory gateway of claim 40, wherein the memory further comprises operational instructions that cause the processing module to vary availability of entries in the address/control buffer based on identity of an entity that initiated the read transaction.

42. The memory gateway of claim 39, wherein the memory further comprises operational instructions that cause the processing module to retrieve the physical address by:

grouping pending read transactions in the address/control buffer, wherein the read transaction is one of the pending transactions; and retrieving, in a sequential order, a group of read transactions that include the read transaction.

43. The memory gateway of claim 42, wherein the memory further comprises operational instructions that cause the processing module to:

group the pending read transactions based on which memory blocks of the first or second memory are being addressed.

44. The memory gateway of claim 39, wherein the memory further comprises operational instructions that cause the processing module to process the read transaction by:

mapping the physical address to the first memory or the second memory;

utilizing the first memory access path when the physical address maps to the first memory; and utilizing the second memory access path when the physical address maps to the second memory.

45. The memory gateway of claim 39, wherein the memory further comprises operational instructions that cause the processing module to process the read transaction by:

providing a complete indication when the data has been read from the first or second memory; and invalidating the read transaction in the address/control buffer based upon the completion indication.

46. The memory gateway of claim 32, wherein the memory further comprises operational instructions that cause the processing module to process the read transaction by:

establishing memory access timing based on parameters of the first or second memory.

* * * * *